United States Patent
Weber et al.

(10) Patent No.: US 8,191,675 B2
(45) Date of Patent: Jun. 5, 2012

(54) SILENCER

(75) Inventors: Stephan Weber, Zwickau (DE); Hans Haecker, Sachsenheim (DE); Frank Roeckle, Leonberg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/451,319

(22) PCT Filed: Apr. 25, 2008

(86) PCT No.: PCT/EP2008/003364
§ 371 (c)(1),
(2), (4) Date: Feb. 22, 2010

(87) PCT Pub. No.: WO2008/138465
PCT Pub. Date: Nov. 20, 2008

(65) Prior Publication Data
US 2010/0140015 A1    Jun. 10, 2010

(30) Foreign Application Priority Data
May 9, 2007  (DE) .......... 10 2007 006 627

(51) Int. Cl.
*F01N 1/10* (2006.01)
*F01N 1/24* (2006.01)
*F01N 1/00* (2006.01)
*F01N 1/08* (2006.01)

(52) U.S. Cl. ............ 181/230; 181/258; 173/DIG. 2
(58) Field of Classification Search ......... 181/258, 181/230, 231, 256; 173/DIG. 2
See application file for complete search history.

(56) References Cited

U.S. PATENT DOCUMENTS

| | | | | |
|---|---|---|---|---|
| 1,326,647 A * | 12/1919 | Cotton et al. | ................ | 137/197 |
| 2,073,480 A * | 3/1937 | Jimerson | ................ | 181/230 |
| 2,748,883 A * | 6/1956 | Millard | ................ | 181/258 |
| 3,672,465 A * | 6/1972 | Blatt et al. | ................ | 181/258 |
| 3,680,659 A * | 8/1972 | Kasten | ................ | 181/230 |
| 3,698,510 A * | 10/1972 | Blatt et al. | ................ | 181/258 |
| 3,823,743 A * | 7/1974 | King | ................ | 138/42 |
| 4,149,862 A * | 4/1979 | Sewell, Sr. | ................ | 96/131 |
| 4,286,976 A * | 9/1981 | Eriksson | ................ | 96/387 |

(Continued)

FOREIGN PATENT DOCUMENTS
DE    29 04 529    8/1980
(Continued)

OTHER PUBLICATIONS

European Patent Office, International Preliminary Report on Patentability, Nov. 19, 2009, from International Patent Application No. PCT/EP2008/003364, filed on Apr. 25, 2008.

(Continued)

*Primary Examiner* — Edgardo San Martin
(74) *Attorney, Agent, or Firm* — Kenyon & Kenyon LLP

(57) ABSTRACT

A silencer is described for damping the outflow noise of compressed air from compressed air appliances, in particular compressed air appliances of vehicles, with an inlet port, with at least one outlet port and with a pot-like housing which is arranged between these ports and which has a pot casing and a pot bottom, a sound-absorbing material in the form of a cartridge of a filter knit, serving for noise damping, being arranged in the inner space of the pot-like housing, characterized in that a layer of fibrous material is arranged between the cartridge and the pot casing.

31 Claims, 1 Drawing Sheet

U.S. PATENT DOCUMENTS

| | | | | |
|---|---|---|---|---|
| 4,319,660 A | * | 3/1982 | Bishop | 181/222 |
| 4,324,314 A | * | 4/1982 | Beach et al. | 181/230 |
| 4,424,883 A | * | 1/1984 | Musiani | 181/258 |
| 4,778,015 A | * | 10/1988 | Jacobsson | 173/169 |
| 4,884,657 A | * | 12/1989 | Osada | 181/258 |
| 5,097,924 A | * | 3/1992 | Reeves | 181/230 |
| 5,145,026 A | * | 9/1992 | Wilder | 181/233 |
| 6,089,346 A | * | 7/2000 | Tredinnick et al. | 181/230 |
| 6,109,387 A | * | 8/2000 | Boretti | 181/230 |
| 6,202,785 B1 | * | 3/2001 | Hilling et al. | 181/230 |
| 6,341,662 B1 | * | 1/2002 | Karlsson | 181/230 |
| 6,935,460 B2 | * | 8/2005 | McCombs et al. | 181/258 |
| 7,753,167 B2 | * | 7/2010 | Fukano et al. | 181/230 |
| 2005/0051382 A1 | * | 3/2005 | Borgmeier | 181/252 |
| 2008/0289900 A1 | * | 11/2008 | Christoffers et al. | 181/258 |

FOREIGN PATENT DOCUMENTS

| | | | |
|---|---|---|---|
| DE | 3243631 A1 | * | 5/1984 |
| DE | 43 06 397 | | 9/1993 |
| DE | 197 01 361 | | 5/1998 |
| DE | 103 41 668 | | 8/2004 |
| EP | 0 537 483 | | 4/1993 |
| GB | 2056563 A | * | 3/1981 |
| JP | 05138551 A | * | 6/1993 |
| WO | WO 9014146 A1 | * | 11/1990 |

OTHER PUBLICATIONS

European Patent Office, Translation of International Preliminary Report on Patentability, Dec. 17, 2009, from International Patent Application No. PCT/EP2008/003364, filed on Apr. 25, 2008.

* cited by examiner

SILENCER

FIELD OF THE INVENTION

The present invention relates to a silencer for damping the outflow noise of compressed air from compressed air appliances, in particular compressed air appliances in vehicles.

BACKGROUND INFORMATION

A silencer is discussed in German Patent Document DE 197 01 361 C1.

For diverting compressed air and expanding this, silencers or noise dampers are provided which are suitable for compressed air systems, in particular of vehicles. They generally consist of a pot-like housing which is filled with sound-absorbing material. The housing has an inlet port and an outlet port, the outlet port in many instances being arranged on the pot bottom. In DE 197 01 361 C1, secondary airways are also additionally provided, which take effect when the sound-absorbing material becomes clogged, whether by impurities and/or wetness which freezes. The sound-absorbing material is a filter knit completely filling the pot-like housing. It is customary to wind such a knitted, mostly tubular material cylindrically in one or two plies and to insert a filter cartridge winded this way into the inner volume of the pot-like housing. In free-field vehicle noise measurement according to Directive 70/157 EWG, a sound pressure level of 72 dB(A) is achieved by such a silencer.

SUMMARY OF THE INVENTION

It is desirable to improve the sound damping properties further. An object of the present invention, therefore, is to improve the silencer of the type initially mentioned, to the effect that compressed air noises are damped to a greater extent.

This object may be achieved by the features described herein. Advantageous refinements and developments of the present invention are also described herein.

An aspect of the present invention is to arrange a layer of fibrous material between the filter cartridge consisting of wound knitted material and the inner wall of the housing. This layer may be a felt mat with fibrous material which is wound around the filter cartridge consisting of the knitted material. The layer of fibrous material may also be applied in the form of flocks and is glued to the inner wall of the housing.

The fibers of the fibrous material may be polyamide fibers. They have approximately a maximum length of 5 mm, the thickness of the layer of fibrous material being of the order of 1 to 3 mm. The layer of fibrous material may lie only against the pot casing. However, it may additionally also lie against the pot bottom.

It is assumed that this additional layer of fibrous material damps oscillations of the cartridge consisting of knitted material and/or the cartridge consisting of knitted material is decoupled from the housing. Consequently, oscillations of the knitted material are not transmitted directly to the housing inner wall and therefore to the housing as a whole, but, instead, are kept away from the housing by the fibrous material which to that extent has poor sound conduction properties. The fibers are in this case oriented predominantly such that they stand obliquely with respect to the housing wall. They therefore neither lie parallel to the housing wall nor stand perpendicularly to this. Consequently, the individual fibers of the layer of fibrous material are subjected predominantly to flexural stress and in this case have good oscillation damping properties.

Tests with a silencer according to the present invention yielded a sound pressure level in free-field vehicle noise measurement according to the abovementioned Directive 70/157 EWG of 69 dB(A). An improvement of 3 dB(A) was thus achieved, as compared with the prior art.

The present invention is described in more detail below by an exemplary embodiment, in conjunction with the drawings described herein.

DETAILED DESCRIPTION

Figure 1:
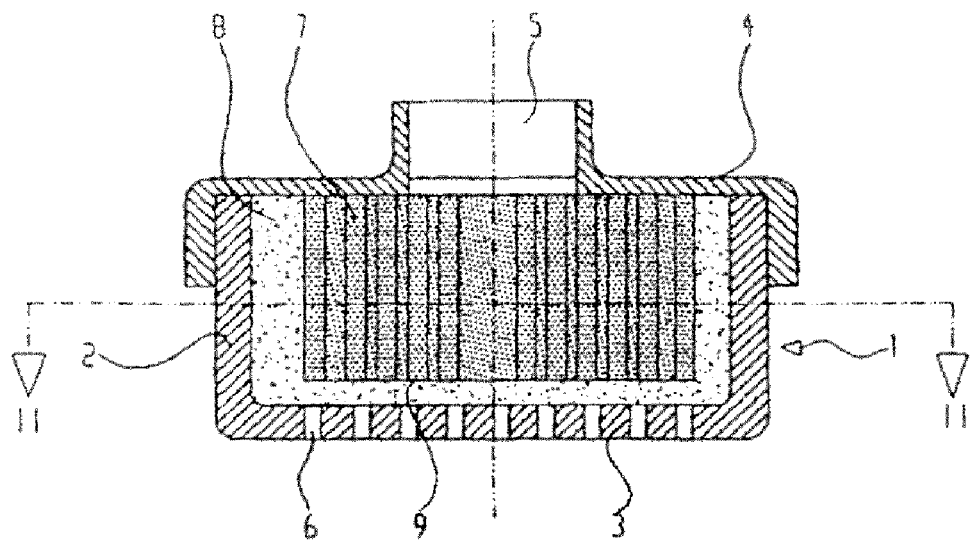
FIG. 1 shows a diagrammatic cross section of a silencer according to the present invention.
Figure 2:
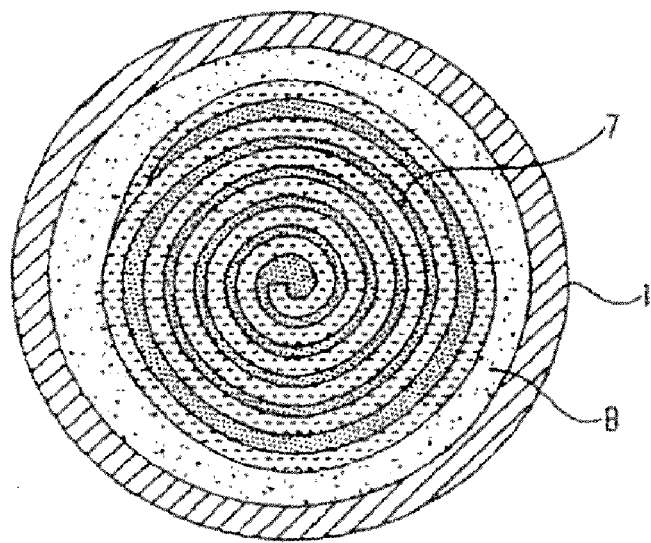
FIG. 2 shows a section along the line A-A of FIG. 1 and therefore a sectional top view of the pot-like housing of the silencer.

The silencer of FIG. 1 has a pot-like housing 1 with a cylindrical pot casing 2 and with a pot bottom 3. The pot-like housing is closed by a cover 4 which has an inlet port 5 for compressed air from a compressed air appliance. The cover 4 is fastened to the pot-like housing 1 in any known way, for example is screwed on or is connected by a latching or snap fastening. The pot bottom 3 has a plurality of outlet ports 6 which, for example, are rectilinear slots running in a star-shaped manner.

A cartridge 7 of a sound-absorbing material in the form of a filter knit, serving for noise damping, is arranged in the inner space of the housing 1. As is known in the prior art, for this purpose, knitted strip material or rolled tubular knitted fabric is wound in one or more plies, thus resulting essentially in a cylindrical body. In the exemplary embodiment illustrated, the knitted fabric is double-ply, as indicated by the different hatching.

To improve the sound damping properties, a layer of fibrous material 8 is arranged between the cartridge 7 and the inner wall of the housing 1. This layer touches at least the post casing 2 and the outer circumference of the cartridge 7. It may, however, also be arranged additionally between the pot bottom 3 and that end face 9 of the cartridge 7 which points towards the bottom.

In a first exemplary embodiment of the present invention, the fibrous material 8 consists of a felt mat with felted individual fibers. These fibers may be polyamide fibers. They may have a maximum length of 5 mm, the layer thickness of the layer of fibrous material 8 being of the order of 1 to 3 mm and may amount to 2 mm.

The predominant fraction of the fibers of the fibrous material 8 is arranged obliquely in each case with respect to the adjacent wall of the housing 1.

According to another exemplary embodiment of the present invention, the layer of fibrous material 8 may also be applied in the form of fiber flocks to the inner wall of the housing. For this purpose, in practice, the inner wall of the housing is first etched slightly, and the fiber flocks are then applied and are connected to the housing inner wall by an adhesive.

The layer of fibrous material 8 thus brings about decoupling between the cartridge consisting of the knitted material and the housing 1, so that the oscillations emanating from the knitted material are not transmitted directly to the housing 1. It is additionally assumed that oscillations of the cartridge 7 are also additionally damped. In summary, a considerable improvement in sound damping is achieved by the layer of fibrous material.

The invention claimed is:

1. A silencer for damping the outflow noise of compressed air from a compressed air appliance of a vehicle, comprising:
    an inlet port;
    at least one outlet port; and
    a pot-like housing which is arranged between the inlet port and the at least one outlet port, and which has a pot casing and a pot bottom, a sound-absorbing material in the form of a cartridge of a filter knit, serving for noise damping, being arranged in the inner space of the pot-like housing;
    wherein a layer of fibrous material is arranged between the cartridge and the pot casing; and
    wherein a layer of fibrous material is arranged between the cartridge and the at least one outlet port.

2. The silencer of claim 1, wherein the fibrous material is wound in a form of a felt mat around an outer circumference of the filter knit.

3. The silencer of claim 1, wherein the fibers of the fibrous material are polyamide fibers.

4. The silencer of claim 1, wherein the fibers of the fibrous material have a maximum length of 5 mm.

5. The silencer of claim 1, wherein the layer of fibrous material has a thickness of 1 to 3 mm.

6. The silencer of claim 1, wherein a predominant fraction of the fibers of the fibrous material is arranged obliquely with respect to the pot casing.

7. The silencer of claim 1, wherein the layer of fibrous material is additionally arranged on the pot bottom.

8. The silencer of claim 1, wherein a predominant fraction of the fibers of the fibrous material which are arranged on the pot bottom is arranged obliquely with respect to the pot bottom.

9. The silencer of claim 1, wherein the layer of fibrous material is applied in flock form to at least one of the pot casing and the pot bottom.

10. The silencer of claim 9, wherein the layer of fibrous material is glued on.

11. The silencer of claim 1, wherein the layer of fibrous material has a thickness of 2 mm.

12. The silencer of claim 1, wherein the fibrous material is wound in a form of a felt mat around an outer circumference of the filter knit, and wherein the fibers of the fibrous material are polyamide fibers.

13. The silencer of claim 12, wherein the fibers of the fibrous material have a maximum length of 5 mm, and wherein the layer of fibrous material has a thickness of 1 to 3 mm.

14. The silencer of claim 12, wherein the fibers of the fibrous material have a maximum length of 5 mm, and wherein the layer of fibrous material has a thickness of 2 mm.

15. The silencer of claim 1, wherein a predominant fraction of the fibers of the fibrous material is arranged obliquely with respect to the pot casing, and wherein the layer of fibrous material is additionally arranged on the pot bottom.

16. The silencer of claim 15, wherein a predominant fraction of the fibers of the fibrous material which are arranged on the pot bottom is arranged obliquely with respect to the pot bottom, and wherein the layer of fibrous material is applied in flock form to at least one of the pot casing and the pot bottom.

17. The silencer of claim 16, wherein a predominant fraction of the fibers of the fibrous material is arranged obliquely with respect to the pot casing, and wherein the layer of fibrous material is additionally arranged on the pot bottom.

18. The silencer of claim 12, wherein a predominant fraction of the fibers of the fibrous material is arranged obliquely with respect to the pot casing, and wherein the layer of fibrous material is additionally arranged on the pot bottom.

19. The silencer of claim 18, wherein a predominant fraction of the fibers of the fibrous material which are arranged on the pot bottom is arranged obliquely with respect to the pot bottom, and wherein the layer of fibrous material is applied in flock form to at least one of the pot casing and the pot bottom.

20. The silencer of claim 18, wherein a predominant fraction of the fibers of the fibrous material is arranged obliquely with respect to the pot casing, and wherein the layer of fibrous material is additionally arranged on the pot bottom.

21. The silencer of claim 1, wherein the layer of fibrous material is applied in the form of fiber flocks to the inner wall of the housing, wherein for this purpose, an inner wall of the housing is first etched slightly, and the fiber flocks are then applied and are connected to the housing inner wall by an adhesive.

22. The silencer of claim 21, wherein the layer of fibrous material provides decoupling between the cartridge consisting of the knitted material and the housing, so that the oscillations emanating from the knitted material are not transmitted directly to the housing.

23. The silencer of claim 22, wherein oscillations of the cartridge are also damped.

24. The silencer of claim 1, wherein the layer of fibrous material provides decoupling between the cartridge consisting of the knitted material and the housing, so that the oscillations emanating from the knitted material are not transmitted directly to the housing.

25. The silencer of claim 24, wherein oscillations of the cartridge are also damped.

26. The silencer of claim 25, wherein the fibers of the fibrous material have a maximum length of 5 mm.

27. The silencer of claim 26, wherein the layer of fibrous material has a thickness of 1 to 3 mm.

28. The silencer of claim 25, wherein the layer of fibrous material has a thickness of 1 to 3 mm.

29. The silencer of claim 23, wherein the fibers of the fibrous material have a maximum length of 5 mm.

30. The silencer of claim 29, wherein the layer of fibrous material has a thickness of 1 to 3 mm.

31. The silencer of claim 23, wherein the layer of fibrous material has a thickness of 1 to 3 mm.

* * * * *